United States Patent
Choquette (10) Patent No.: US 11,602,960 B2
(45) Date of Patent: Mar. 14, 2023

(54) FIFTH WHEEL HITCH

(71) Applicant: AUTOMATIC EQUIPMENT MANUFACTURING CO., Pender, NE (US)

(72) Inventor: Paul Choquette, Eagle, NE (US)

(73) Assignee: AUTOMATIC EQUIPMENT MANUFACTURING CO., Pender, NE (US)

( * ) Notice: Subject to any disclaimer, the term of this patent is extended or adjusted under 35 U.S.C. 154(b) by 191 days.

(21) Appl. No.: 17/212,542

(22) Filed: Mar. 25, 2021

(65) Prior Publication Data
US 2022/0305854 A1    Sep. 29, 2022

(51) Int. Cl.
*B60D 1/01*  (2006.01)
*B60D 1/02*  (2006.01)
(Continued)

(52) U.S. Cl.
CPC .............. *B60D 1/015* (2013.01); *B60D 1/02* (2013.01); *B60D 1/065* (2013.01); *B60D 1/075* (2013.01);
(Continued)

(58) Field of Classification Search
CPC .......... B60D 1/015; B60D 1/02; B60D 1/065; B60D 1/075; B62D 53/0807; B62D 53/0842
See application file for complete search history.

(56) References Cited

U.S. PATENT DOCUMENTS

| 8,523,217 B2 * | 9/2013 | Andersen ............... B60D 1/488 280/504 |
| 9,676,429 B1 | 6/2017 | Rhodes et al. |

(Continued)

FOREIGN PATENT DOCUMENTS

| CA | 2935507 C | 1/2018 |
| CA | 3017133 A1 | 2/2020 |

OTHER PUBLICATIONS https://andersenhitches.com/collections/ultimate-5th-wheel.

*Primary Examiner* — Jacob D Knutson
*Assistant Examiner* — Ryan Edward Hardy
(74) *Attorney, Agent, or Firm* — McGrath North Mullin & Kratz PC LLO; Luke C. Holst (57) ABSTRACT

The present invention relates in general to a fifth wheel hitch and method of using a fifth wheel hitch that is mounted to a bed of a towing vehicle, and more specifically, to a fifth wheel hitch that is vertically secured to a kingpin of a fifth wheel trailer without requiring the use of adapters or extensions. One aspect of the fifth wheel hitch and method of use includes a hitch head assembly that is adjustable in height such that the fifth wheel hitch is compatible with different sizes of towing vehicles and fifth wheel trailers. The hitch head assembly also incorporates a funnel shaped design for receiving the kingpin of the fifth wheel trailer in a vertical fashion to prevent the kingpin from sliding horizontally out of the hitch head after being pulled forward by the towing vehicle. A four-way pivot joint accommodates instantaneous variations in pitch and/or roll attitudes between the towing vehicle and the fifth wheel trailer connected by the fifth wheel hitch. The hitch head assembly further includes a latching and locking mechanism that indicates whether or not a secure connection has been properly executed between
(Continued)

the fifth wheel hitch and fifth wheel trailer to assure an operator that the towing vehicle is ready for travel.

20 Claims, 6 Drawing Sheets (51) Int. Cl.
*B62D 53/08* (2006.01)
*B60D 1/07* (2006.01)
*B60D 1/06* (2006.01)

(52) U.S. Cl.
CPC ..... *B62D 53/0807* (2013.01); *B62D 53/0842* (2013.01)

(56) References Cited

U.S. PATENT DOCUMENTS

| | | |
|---|---|---|
| 10,065,467 B2 | 9/2018 | Pulliam et al. |
| 10,351,185 B1 | 7/2019 | Rhodes et al. |
| 10,486,479 B2 * | 11/2019 | Pulliam .................. B60D 1/58 |
| 10,723,188 B2 * | 7/2020 | Andersen ........... B62D 53/0842 |
| 10,759,240 B2 | 9/2020 | Pulliam et al. |
| 11,376,905 B2 * | 7/2022 | Westervelt ............... B60D 1/46 |
| 2012/0280473 A1 * | 11/2012 | Andersen ................ B60D 1/06 |
| | | 280/511 |
| 2017/0217268 A1 * | 8/2017 | Andersen ................ B60D 1/06 |
| 2020/0398622 A1 * | 12/2020 | McGory ............... B60D 1/485 |

\* cited by examiner

FIFTH WHEEL HITCH

FIELD OF THE INVENTION

The present invention relates to towing accessories and, more particularly without limitation, to hitches for connecting a fifth wheel trailer to a towing vehicle.

BACKGROUND OF THE INVENTION

A fifth wheel hitch is used to connect a fifth wheel trailer or a gooseneck trailer to a towing vehicle. Although there are variations in which such a trailer is connected to the towing vehicle, typically the trailer includes a cylindrically-shaped kingpin extending vertically-downwardly from a horizontally-orientated trailer plate, with the kingpin having a distal end with a smaller-diameter portion and a larger-diameter portion. The kingpin is utilized for releasable connection to the fifth wheel hitch mounted on the towing vehicle. Alternatively in place of the kingpin, the trailer may utilize a hitch ball for releasable connection to the fifth wheel hitch.

The fifth wheel hitch generally includes several components. For example, a lowermost component of the fifth wheel hitch typically includes a base secured to the towing vehicle, commonly in the bed of a pickup truck. An uppermost component of a fifth wheel hitch generally includes a hitch head mounted on an intermediate platform, which in turn is mounted on the base. The hitch head typically includes a horizontally-oriented hitch plate having a rearward-facing, horseshoe-shaped throat configured to receive the kingpin of the trailer. The rearward-facing throat of the fifth wheel hitch often includes a kingpin receiver which generally comprises a pair of opposing jaws for lockingly capturing the smaller-diameter portion of the kingpin. In this manner the towing vehicle and the trailer can operatively pivot relative to each other about a vertically-oriented pivot axis of the kingpin to accommodate yaw as the trailer is being towed around a corner, for example. The trailer plate and the hitch plate jointly provide abutting bearing surfaces for operatively supporting the front end of the trailer when the trailer is connected to the fifth wheel hitch of the towing vehicle.

Such traditional fifth wheel hitches as described above require the kingpin of the trailer to enter the rearward-facing throat of the fifth wheel hitch in a horizontal motion and at a very specific height. To say such a system is difficult to operate would be an understatement because the towing vehicle must be reversed into the kingpin at the exact vertical height—and within a few inches horizontally—such that the kingpin can slide into the horseshoe-shaped throat of the hitch head. Indeed, this operation can be almost impossible due to limited space constrictions often placed on an operator of the towing vehicle. It is not unusual for the operator to find themselves in a congested situation which requires substantially greater maneuvering space than may be available, particularly in regard to recreational vehicle (RV) parks having an abundance of trees, narrow lots, and cars parked alongside streets, or narrow mountainous roads when confronted with impassable tunnels, overhead rock abutments, and uneven terrain. To help assist with these difficulties, adapters and/or extensions have been developed that may be added to the kingpin of the trailer. Such adapters/extensions provide the operator with an ability to adjust the attachment location of the trailer to the fifth wheel hitch. However because these adapters/extensions add length or bending moments to the trailer that are not otherwise anticipated by the trailer manufacturer, consequently, trailer manufacturers often void their warranty if adapters/extensions are utilized.

Another problem with such traditional fifth wheel hitches is that it is difficult for the operator to quickly and reliably ascertain whether the kingpin is properly secured inside the kingpin receiver. Often the pair of opposing jaws for lockingly capturing the kingpin are located inside the kingpin receiver and therefore not visible to the operator to confirm that a secure connection has been made. If the kingpin is not fully secured inside the kingpin receiver the outcome can be catastrophic and result in extreme damage and injury to the towing vehicle, trailer and operator. For instance after the towing vehicle pulls forward the kingpin of the trailer may slide horizontally out of the throat of the hitch head, causing the trailer to fall onto the bed of the towing vehicle and extensively damaging the towing vehicle and front end of the trailer.

For these reasons a desire remains to provide a fifth wheel hitch that is easy to maneuver into position and allows for quick and reliable confirmation that a secure connection has been made between the kingpin of the trailer and the hitch head of the fifth wheel hitch. Thus, what is needed is a fifth wheel hitch that does not require the kingpin to enter the hitch head in a horizontal motion and at a specific height. What is further needed is a fifth wheel hitch design that prevents the kingpin from sliding horizontally out of the hitch head after being pulled forward by a towing vehicle to improve safety for the operator.

BRIEF SUMMARY OF THE INVENTION

According to one aspect of the present disclosure, a fifth wheel hitch is provided. The fifth wheel hitch may include a base assembly having a connecting mechanism for removably attaching the fifth wheel hitch to a hitch ball mounted on a bed of a towing vehicle. The fifth wheel hitch may further include a hitch head assembly configured to connect to a kingpin of a fifth wheel trailer without the use of adapters or extensions. The hitch head assembly may be adjustable in height with respect to the base assembly and vertically secured in position to fit variances in different sizes of towing vehicles and fifth wheel trailers. The hitch head assembly may also comprise a four-way pivot joint configured to pivot about a horizontally-oriented fore and aft axis and a horizontally-oriented, transverse axis to enable the hitch head assembly to automatically adapt to instantaneous variations in pitch and/or roll attitudes between the towing vehicle and the fifth wheel trailer during use. A funnel shaped kingpin receiver opening on the hitch head assembly is designed for receiving the kingpin of the fifth wheel trailer, wherein the kingpin may be lowered into the kingpin receiver opening in a vertical motion rather than horizontal as compared to traditional fifth wheel hitches. The kingpin may be secured inside the hitch head assembly using a latching and locking mechanism that reliably indicates whether a secure connection has been made between the kingpin of the fifth wheel trailer and the fifth wheel hitch. In this aspect, the kingpin is prevented from sliding horizontally out of the hitch head assembly after being pulled forward by the towing vehicle to prevent accidents.

According to another aspect of the present disclosure, a method of using the fifth wheel hitch of the present disclosure is provided. The method may include providing the fifth wheel hitch of the present disclosure, along with a fifth wheel trailer and towing vehicle. The method may further include connecting the fifth wheel hitch to a hitch ball of the towing vehicle. The hitch head assembly of the fifth wheel hitch may be raised or lowered to an appropriate height and vertically secured in position depending on the particular size of the towing vehicle and fifth wheel trailer. The method may further comprise positioning the hitch head assembly of the fifth wheel hitch approximately underneath the kingpin of the fifth wheel trailer. The latching and locking mechanism of the fifth wheel hitch may be placed in the open and unlocked position for receiving the kingpin. The kingpin may then be lowered into the funnel shaped kingpin receiver opening of the hitch head assembly. The method may further include confirming whether a secure connection between the kingpin and the fifth wheel hitch has been properly executed. After receiving confirmation, the latching and locking mechanism may be transitioned to the closed and locked position to effectively lock the kingpin inside the hitch head assembly wherein the towing vehicle is ready for travel.

PRINCIPAL OBJECTS AND ADVANTAGES OF THE INVENTION

Therefore, it is a principal object, feature, and/or advantage of the present disclosure to overcome the aforementioned deficiencies in the art and provide a fifth wheel hitch which clearly and reliably indicates whether or not a secure connection between a kingpin of a trailer and a fifth wheel hitch of a towing vehicle has been properly executed.

Another object, feature, and/or advantage of the present disclosure is to provide a fifth wheel hitch that is easy to operate and maneuver into position without requiring the kingpin of the trailer to enter the throat of the hitch head in a horizontal motion and at a specific height.

Yet another object, feature, and/or advantage of the present disclosure is to provide a fifth wheel hitch structured to prevent the kingpin of the trailer from sliding horizontally out of the throat of the hitch head after being pulled forward by the towing vehicle to improve safety.

A further object, feature, and/or advantage of the present disclosure is to provide a fifth wheel hitch having a hitch head that is adjustable in height to be compatible with different sized towing vehicles and trailers.

A still further object, feature, and/or advantage of the present disclosure is to provide a fifth wheel hitch having a hitch head with a four-way pivot joint structured to allow the hitch head to pivot about a horizontally-oriented, fore-and-aft axis and a horizontally-oriented transverse axis to accommodate instantaneous variations in pitch and/or roll attitudes between the towing vehicle and the trailer and to reduce shock to the towing vehicle, trailer and occupants of the towing vehicle.

Another object, feature, and/or advantage of the present disclosure is to provide a fifth wheel hitch that is secured to the kingpin of the trailer without use of any additional adapters or extensions.

Yet another object, feature, and/or advantage of the present disclosure is to provide a fifth wheel hitch that may be used with all types, sizes, models and manufacturers of towing vehicles and trailers.

Other objects, features, and advantages of this disclosure will become apparent from the following description taken in conjunction with the accompanying drawings wherein are set forth, by way of illustration and example and without limitation, certain aspects of this disclosure. The present disclosure is not to be limited to or by these objects, features, and advantages. No single aspect need provide each and every object, feature, or advantage.

BRIEF DESCRIPTION OF THE DRAWING FIGURES

FIGS. 1-10 represent examples of the fifth wheel hitch of the present disclosure.

DETAILED DESCRIPTION OF THE INVENTION

Referring generally to FIGS. 1-10, the present disclosure is directed to a fifth wheel hitch 10 and a method of using the fifth wheel hitch 10 to connect a fifth wheel trailer 12 to a towing vehicle 14. While certain aspects of the present disclosure are shown and described herein, it is understood that such aspects are merely exemplary. The present disclosure is not intended to be limited to these specific aspects and may encompass other aspects or embodiments. Therefore, specific structural and functional details disclosed herein are not to be interpreted or inferred as limiting, but merely as a basis for the claims and as a representative basis for teaching one skilled in the art how to make and use the disclosed subject matter.

Figure 1:
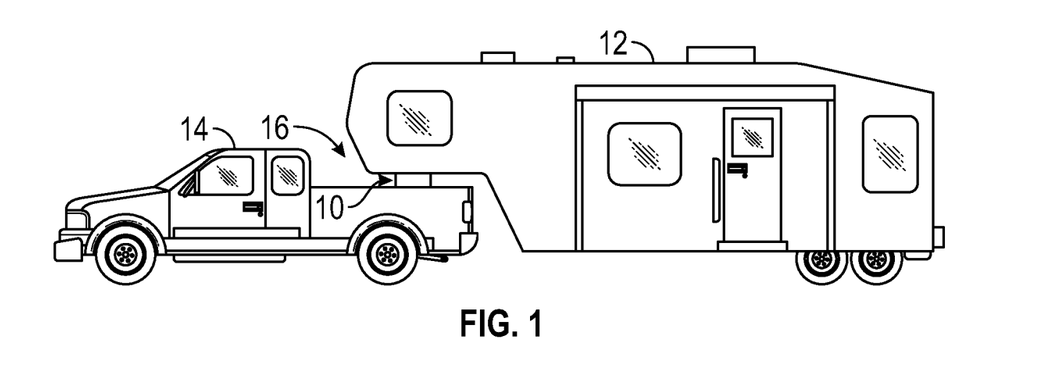
FIG. 1 is a side view of a fifth wheel trailer connected to a fifth wheel hitch of the present disclosure mounted on a bed of a towing vehicle.

FIG. 1 illustrates a side view of the fifth wheel trailer 12 connected to the fifth wheel hitch 10 of the present disclosure mounted on a bed 16 of the towing vehicle 14. The towing vehicle 14 may comprise a towing vehicle capable of supporting a fifth wheel hitch, such as a pickup truck or a flat-bed truck. The fifth wheel trailer 12 may be an RV or other trailer that is towed using a fifth wheel. The fifth wheel hitch 10 is structured and configured to be easily uninstalled into separate, relatively light-weight modules, to then be conveniently transported, such as manually or by automobile for example, for reassembly and reinstallation on another towing vehicle. The fifth wheel hitch 10 may be formed from metal, aluminum and/or plastic components that are fastened together using welds, adhesives, bolts, rivets, combinations thereof, or otherwise.

Figure 2:
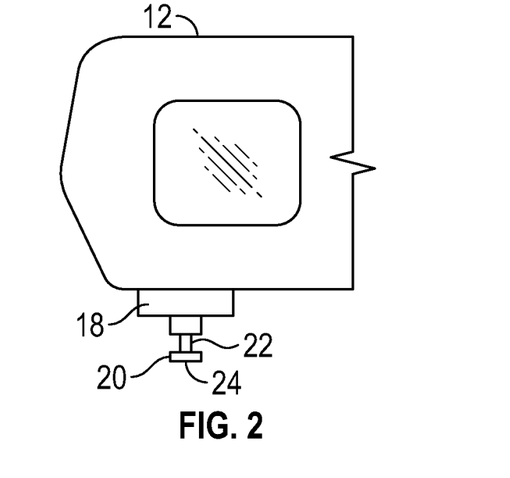
FIG. 2 is a side view of a front end of the fifth wheel trailer showing a kingpin and a trailer plate thereof.

FIG. 2 illustrates a side view of a front end of the fifth wheel trailer 12 showing a horizontally-oriented trailer plate 18 and a cylindrically-shaped kingpin 20 extending vertically-downwardly from hitch plate 18 and having an annular groove 22 spaced near distal end 24 thereof. Often adapters or extensions (not shown), such as a pin box adapter, may be used to attach the kingpin 20 of the fifth wheel trailer 12 to the fifth wheel hitch 10. The fifth wheel hitch 10 of the present disclosure, however, is structured to receive the kingpin 20 of the fifth wheel trailer 12 without any additional adapters or extensions attached to the kingpin 20. Thus the fifth wheel hitch 10 of the present disclosure it is neither intended to be used with—nor is it capable of using—additional adapters and/or extensions attached to the kingpin 20 of the fifth wheel trailer 12.

Figure 3:
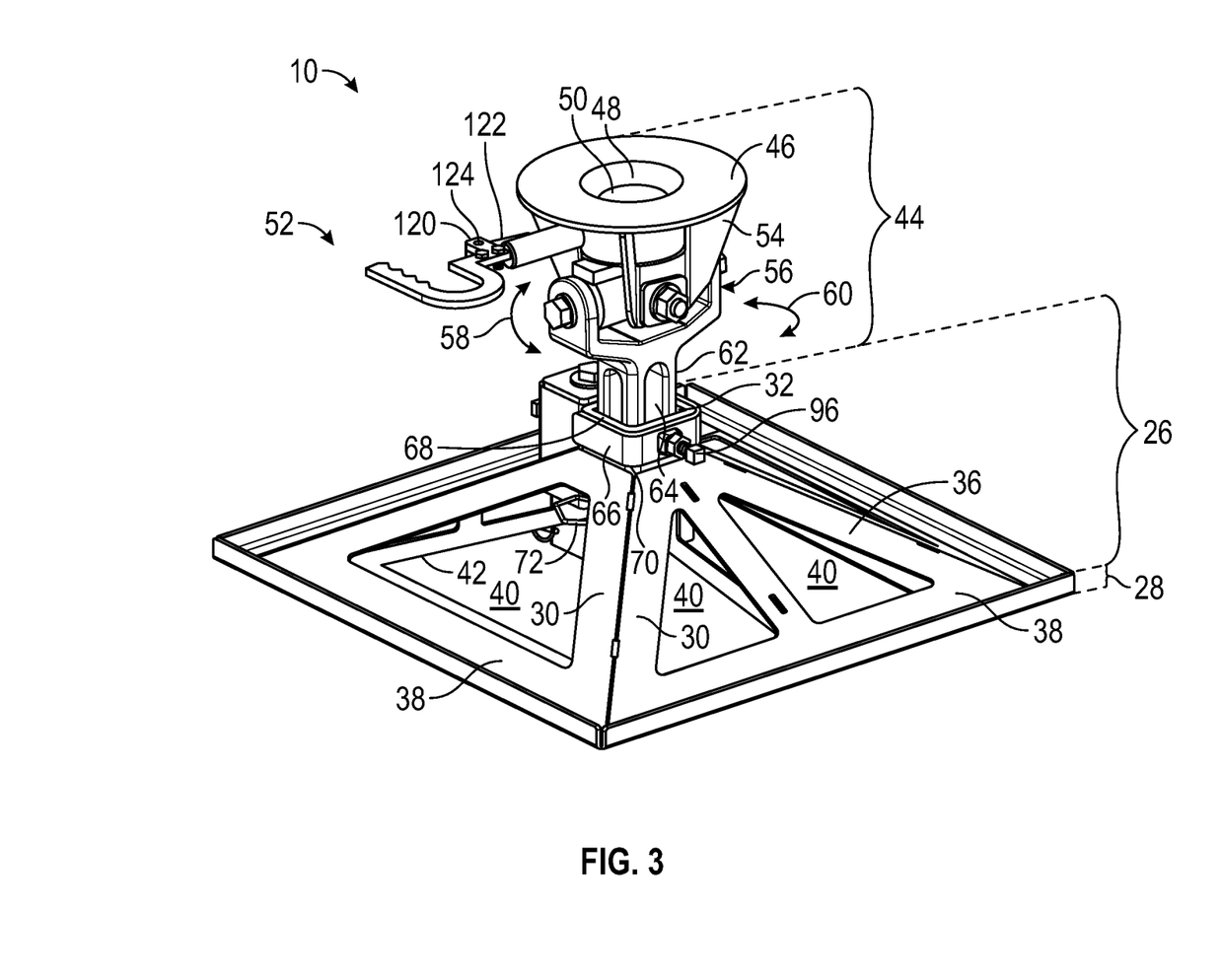
FIG. 3 is a perspective view of the fifth wheel hitch of the present disclosure.

FIG. 3 illustrates a perspective view of the fifth wheel hitch 10 of the present disclosure. The fifth wheel hitch 10 includes a base assembly 26. The base assembly 26 generally has a pyramidal shape comprising platform 28, a plurality of side walls 30, and a central top opening 32. The platform 28 may comprise a plurality of elongate, flat members 34 that are configured to contact and rest upon a surface of the bed 16 of the towing vehicle 14. Alternatively, the platform 28 may comprise a plurality of tubular members 34 wherein a cross section of the tubular members 34 may include a circular, square, rectangular, triangular, polygonal or other enclosed tubular shape. The platform 28 may comprise a square or rectangular shape structured to spread load on the bed 16 of the towing vehicle 14 that is placed on the fifth wheel hitch 10 by the fifth wheel trailer 12. The platform 28 may include a high friction coating on a lower surface of the platform 28 to help prevent slippage and damage to the bed 16 of the towing vehicle 14 during towing of the fifth wheel trailer 12.

Shown in FIG. 3, a plurality of side walls 30 may be affixed to the platform 28 of the base assembly 26. The plurality of side walls 30 are structured to support the weight of the kingpin 20 during towing of the fifth wheel trailer 12. In particular, each side wall 30 may comprise a flat planar surface generally shaped as an isosceles trapezoid. Each side wall 30 may include at least two upright members 36, at least two horizontal members 38, and at least one opening 40 traversing through the side wall 30. Alternatively, the side wall 30 may comprise a cohesive surface without opening(s) 40. The plurality of side walls 30 are configured to be affixed together to form a central top opening 32 at the top of its pyramidal shape. The base assembly 26 may further comprise a height adjustment sleeve 66 traversing through the central, top opening 32. The height adjustment sleeve 66 may be affixed to the plurality of side walls 30 and at least one support brace 42. The at least one support brace 42 is structured to provide additional reinforcement to the sidewalls 30 of the base assembly 26 during towing of the fifth wheel trailer 12.

Further shown in FIG. 3, the fifth wheel hitch 10 also includes a hitch head assembly 44. The hitch head assembly 44 may comprise a horizontally-oriented hitch plate 46, a funnel shaped kingpin receiver opening 48, and a kingpin receiver socket 50. In use, the hitch plate 46 of the fifth wheel hitch 10 abuttingly engages the trailer plate 18 of the fifth wheel trailer 12. As the towing vehicle 14 and the fifth wheel trailer 12 negotiate turns, the hitch plate 46 rotates relative to the trailer plate 18 about the kingpin 20. Due to friction generated between the hitch plate 46 and the trailer plate 18, those surfaces are typically greased with an appropriate lubricant to prolong the useful lives thereof. To minimize or eliminate the need for such lubricant, the hitch plate 46 for some aspects of the fifth wheel hitch 10 of the present disclosure may be constructed of an ultra high molecular weight polyethylene substance or other suitable material, which minimizes or entirely eliminates the need for a lubricant.

Still further shown in FIG. 3, the hitch plate 46 may comprise a circular shape having an outer edge and an inner edge. The inner edge of the hitch plate 46 is connected to an outer edge of a funnel shaped kingpin receiver opening 48. The inner edge of the funnel shaped kingpin receiver opening 48 is connected to a kingpin receiver socket 50 for receiving the kingpin 20 of the fifth wheel trailer 12. In particular, the kingpin 20 may be lowered into the funnel shaped kingpin receiver opening 48 in a vertical motion rather than horizontal as compared to traditional fifth wheel hitches. The kingpin 20 may then be secured inside the socket 50 using a latching and locking mechanism 52 and, specifically, without the use of any adapters or extensions. The kingpin receiver opening 48 may extend beyond an inner diameter of the socket 50, wherein the funnel shaped kingpin receiver opening 48 is cantilevered to help guide the kingpin 20 into the socket 50 as it is lowered vertically into position. In this manner, the operator of the towing vehicle 14 may conveniently maneuver the fifth wheel hitch 10 into position under the kingpin 20 of the fifth wheel trailer 12 without requiring the kingpin 20 to enter the fifth wheel hitch 10 in a horizontal motion and at a very specific height as required by traditional fifth wheel hitches. The hitch plate 46, kingpin receiver opening 48, and socket 50 may further incorporate a plurality of brackets 54 structured to provide additional support to the hitch head assembly 44. The hitch plate 46, kingpin receiver opening 48, socket 50 and brackets 54 may be integrally formed, or alternatively, separately formed and affixed together.

Shown in FIG. 3, the hitch head assembly 44 may comprise a four-way pivot joint 56 configured to pivot about a horizontally-oriented fore and aft axis 58 and a horizontally-oriented, transverse axis 60 in a gimbal-like manner to thereby enable the hitch head assembly 44 to automatically adapt to an abutting engagement with the trailer plate 18 of the fifth wheel trailer 12 being connected thereto. The four-way pivot joint 56 is further configured to accommodate instantaneous variations in pitch and/or roll attitudes between the towing vehicle 14 and the fifth wheel trailer 12 and to reduce shock to the towing vehicle 14, fifth wheel trailer 12 and occupants of the towing vehicle 14 during use.

Also shown in FIG. 3, the hitch head assembly 44 may be removably connected to the base assembly 26. In particular, the hitch head assembly 44 may comprise a vertical member 62 affixed to a bottom portion of the four-way pivot joint 56. The vertical member 62 may be integrally formed with the four-way pivot joint 56 or, alternatively, formed separately and affixed together thereafter. The vertical member 62 may include a series of channels 64, wherein at least one side of the vertical member 62 includes a channel 64 extending vertically along an exterior of the vertical member 62. The vertical member 62 is configured to be received in the height adjustment sleeve 66 traversing through the central, top opening 32 of the base assembly 26. The height adjustment sleeve 66 may comprise an open upper end 68 to receive the vertical member 62 and an opposite, closed lower end 70. Alternatively, the lower end 70 may also be open.

Further shown in FIG. 3, the vertical member 62 is configured to telescopingly slide inside the height adjustment sleeve 66 such that the hitch head assembly 44 may be adjustable in height. The height adjustment sleeve 66 may further comprise at least two channel locks 72 configured to work in coordination with the series of channels 64 to selectively lock the vertical member 62 at a particular vertical position within the height adjustment sleeve 66. In this manner the hitch head assembly 44 may be raised or lowered in height with respect to the base assembly 26 and vertically secured in position to fit variances in different sizes of towing vehicles 14 and fifth wheel trailers 12. The vertical member 62 is also adjustable in height such that the hitch head assembly 44 may be sufficiently elevated above the bed 16 of the towing vehicle 14 wherein the foremost portion of the fifth wheel trailer 12 is supported above various features of the towing vehicle 14, such as sides and tailgate of the bed 16 for example. While the vertical member 62 and the height adjustment sleeve 66 are depicted in FIG. 3 as having a square cross section, it is contemplated by the present disclosure that the vertical member 62 and height adjustment sleeve 66 could comprise a cylindrical, rectangular or other polygonal shape.

Figure 4:
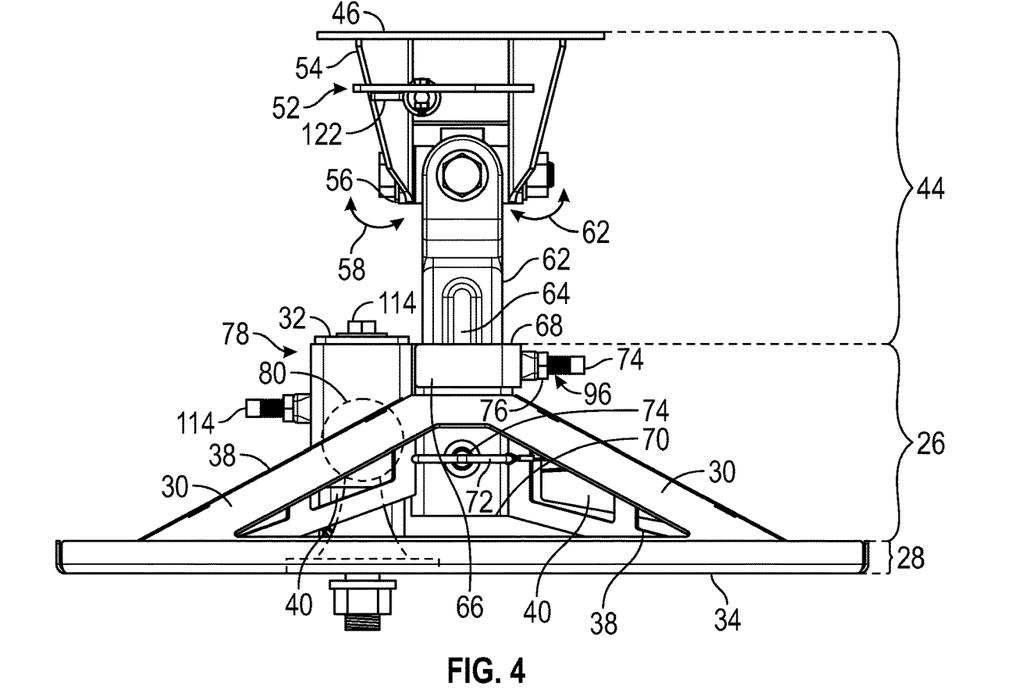
FIG. 4 is a left side view of the fifth wheel hitch shown in FIG. 3.
Figure 5:
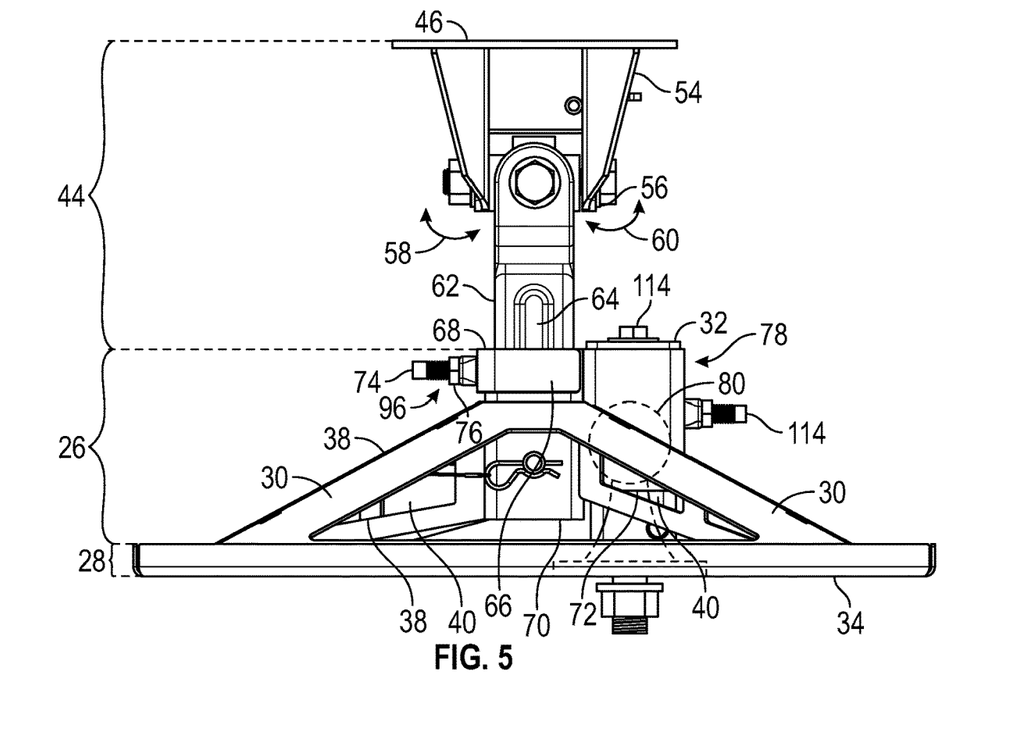
FIG. 5 is a right side view of the fifth wheel hitch shown in FIGS. 3-4.

FIGS. 4, 5 illustrate left and right side views, respectively, of the fifth wheel hitch 10 of FIG. 3. In particular, a left side wall 30 of the base assembly 26 may include opening 40 of a suitable size that allows for the operator to reach and adjust a first channel lock 72 located on the height adjustment sleeve 66 located inside the base assembly 26. The first channel lock 72 may comprise a threaded bolt 74 extending through an internally threaded aperture 76 positioned on a side of the height adjustment sleeve 66. Tightening the threaded bolt 74 provides a biasing force against the vertical member 62 to selectively lock the vertical member 62 at a particular vertical position within the height adjustment sleeve 66. The threaded bolt 74 may be aligned inside channel 64 of the vertical member 62 to help maintain the threaded bolt 74 in a proper position against the vertical member 62. In the aspect shown herein, the first channel lock 72 is depicted as threaded bolt 74 having an adjustable handle and a threaded aperture 76 for receiving the threaded bolt 74. However, other types of fasteners are also contemplated by the present disclosure. For example, a series of perpendicular aligned holes (not shown) traversing through the vertical member 62 may be utilized. A pair of aligned holes (not shown) on opposite sides of the height adjustment sleeve 66 may also be utilized. A pin (not shown) may extend through aligned holes of the vertical member 62 and the height adjustment sleeve 66 and held in position using a removable lynch pin, r-clip, cotter pin or other fastening device (not shown). The series of perpendicular aligned holes of the vertical member 62, the pair of aligned holes of the height adjustment sleeve 66, and the pin may therefore be used to selectively lock the vertical member 62 at a particular vertical position within the height adjustment sleeve 66.

Shown in FIGS. 4, 5, the fifth wheel hitch 10 may further comprise a connecting mechanism 78 for applications where the towing vehicle 14 has a hitch ball 80 mounted on the bed 16 for connecting to a gooseneck trailer 12. The connecting mechanism 78 may be fixedly secured to the height adjustment sleeve 66 of the base assembly 26 and structured to securely attach the fifth wheel hitch 10 to the hitch ball 80.

Figure 6:
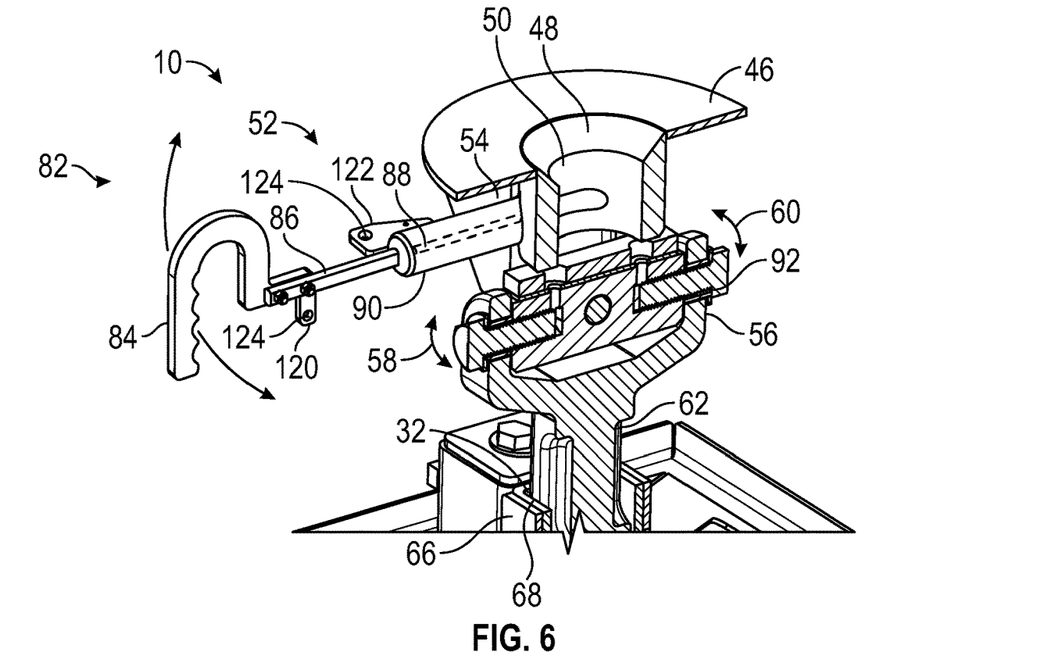
FIG. 6 is a magnified, sectional view of the left side of the fifth wheel hitch of FIG. 4, showing a latching and locking mechanism in an open and unlocked position.

FIG. 6 illustrates a magnified, sectional view of the left side of the fifth wheel hitch 10 of FIG. 4, showing the latching and locking mechanism 52 in an open and unlocked position 82. In particular, the open and unlocked position 82 of the latching and locking mechanism 52 is configured for receiving or removing the kingpin 20 of the fifth wheel trailer 12 from the kingpin receiver socket 50 of the hitch head assembly 44.

The latching and locking mechanism 52 may comprise a latch handle 84, a stopper 86, a locking pin 88, a conduit 90 entering socket 50, and a biasing spring 92. The latch handle 84 may be connected to the stopper 86. The stopper 86 and locking pin 88 may be integrally formed from a single straight rod of material, such as metal. An outer circumference of the stopper 86 portion of the rod may comprise a particular shape, such as a flat capsule shape. An outer circumference of the locking pin 88 portion of the rod may comprise a different shape, such as a round cylindrical shape. Other outer circumference shapes of the stopper 86 and locking pin 88 portions of the rod are also contemplated by the present disclosure (e.g., triangular, square, oval, pentagonal, etc.). The stopper 86 may also have a larger diameter than the locking pin 88. The stopper 86 and locking pin 88 may both be configured to slidably fit inside the conduit 90, wherein the conduit 90 may comprise a hollow tube. An opening into and/or interior circumference of the conduit 90 may comprise a shape corresponding to the outer circumference shape of the stopper 86, wherein the stopper 86 may snugly and slidably fit inside the conduit 90 (e.g., akin to a key inside a key hole). The locking pin 88 may slidably fit inside the conduit 90 and rotate therein. The biasing spring 92 may be configured to proximally draw the locking pin 88 into the socket 50. The biasing spring 92 may be further configured to secure the locking pin 88 inside the conduit 90 and prevent the locking pin 88 from being pulled distally out of the conduit 90.

To transition the latching and locking mechanism 52 to the open and unlocked position 82, the latch handle 84 may be pulled distally away from the hitch head assembly 44 to effectively remove the stopper 86 from the conduit 90 and the locking pin 88 from the socket 50. The latch handle 84 may thereafter be rotated in a first direction approximately 90° wherein the outer circumference shape of the stopper 86 is approximately perpendicular to the corresponding shape of the opening and/or interior circumference of the conduit 90 and thus no longer fits within. In this manner the stopper 86 abuts conduit 90 to prevent the locking pin 88 from being drawn back into the socket 50 by biasing spring 92. The open and unlocked position 82 of the latching and locking mechanism 52 is therefore configured for receiving or removing the kingpin 20 of the fifth wheel trailer 12 from the socket 50 of the hitch head assembly 44.

Figure 7:
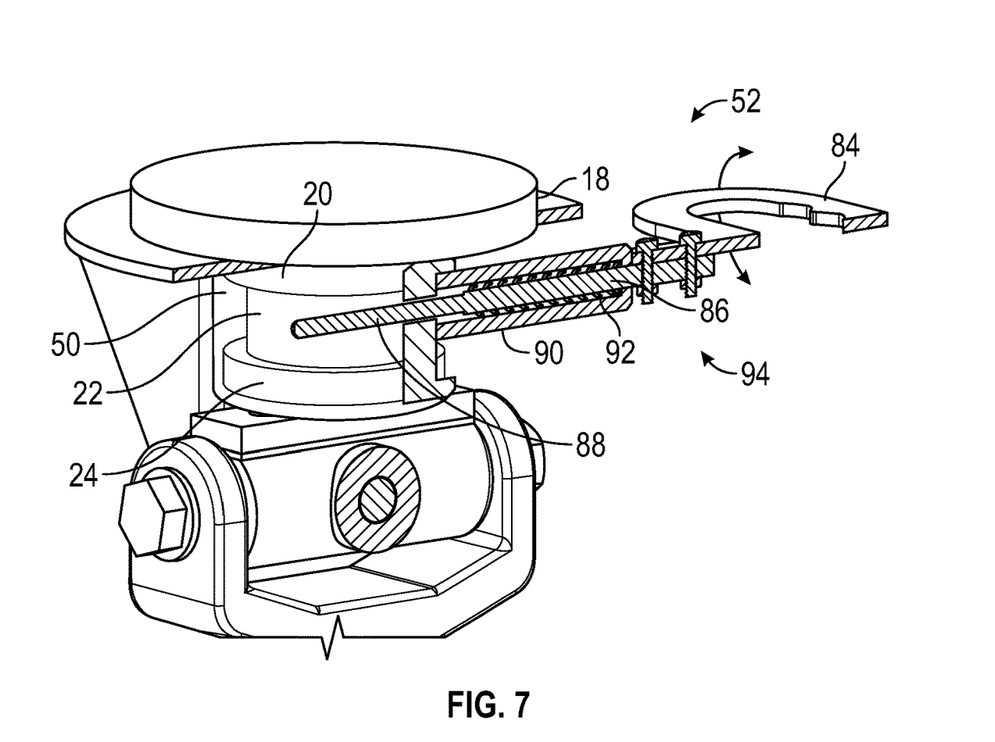
FIG. 7 is a magnified, sectional view of the right side of the fifth wheel hitch of FIG. 5, showing the latching and locking mechanism in a closed and locked position.

FIG. 7 illustrates a magnified, sectional view of the right side of the fifth wheel hitch 10 of FIG. 5, showing the latching and locking mechanism 52 in a closed and locked position 94. The closed and locked position 94 of the latching and locking mechanism 52 is configured to reliably secure the kingpin 20 of the fifth wheel trailer 12 inside the socket 50 of the hitch head assembly 44 during use. In particular, the kingpin 20 of the fifth wheel trailer 12 may be lowered through the funnel shaped kingpin receiver opening 48 and into the socket 50 of the hitch head assembly 44 in a vertical motion while the latching and locking mechanism 52 is in the open and unlocked position 82. Thereafter to transition the latching and locking mechanism 52 to the closed and locked position 94, the latch handle 84 may be pulled outward away from the hitch head assembly 44 and rotated in an opposite, second direction approximately 90°. In this manner the outer circumference shape of the stopper 86 once again fits within the corresponding shape of the opening and/or interior circumference of the conduit 90. The biasing spring 92 is configured to draw the stopper 86 proximally into conduit 90 and the locking pin 88 into socket 50. Specifically, the locking pin 88 is inserted within the annular groove 22 of the adjacent kingpin 20 to effectively lock the kingpin 20 inside the socket 50 of the hitch head assembly 44 in the closed and locked position 94. The biasing spring 92 serves to maintain the locking pin 88 in the closed and locked position 94. Consequently the kingpin 20 is prevented from sliding horizontally out of the socket 50 of the hitch head assembly 44 after being pulled forward by the towing vehicle 14. The operator of the fifth wheel hitch 10 may reliably confirm that a secure connection has been made between the kingpin 20 of the fifth wheel trailer 12 and the fifth wheel hitch 10 because the latching and locking mechanism 52 is in the closed and locked position 94 and the kingpin 20 is constrained inside the socket 50 of the hitch head assembly 44. If the latching and locking mechanism 52 will not transition into the closed and locked position 94 then the operator knows that the kingpin 20 is not secure within the socket 50 of the hitch head assembly 44 and adjustments may be made accordingly. Further shown in FIG. 3, the latching and locking mechanism 52 may include a latch 120 on the latch handle 84 having an opening 124 that is configured to align with an opening 124 on a hasp 122 on the conduit 90. The openings 124 of the latch 120 and hasp 122 are configured to align in the closed and locked position 94. The operator may therefore place a padlock or removable lynch pin, r-clip, cotter pin or other fastening device (not shown) in the aligned openings 124 of the latch 120 and hasp 122 in the closed and locked position 94 to further secure the kingpin 20 within the socket 50 of the hitch head assembly 44 during operation.

Figure 8:
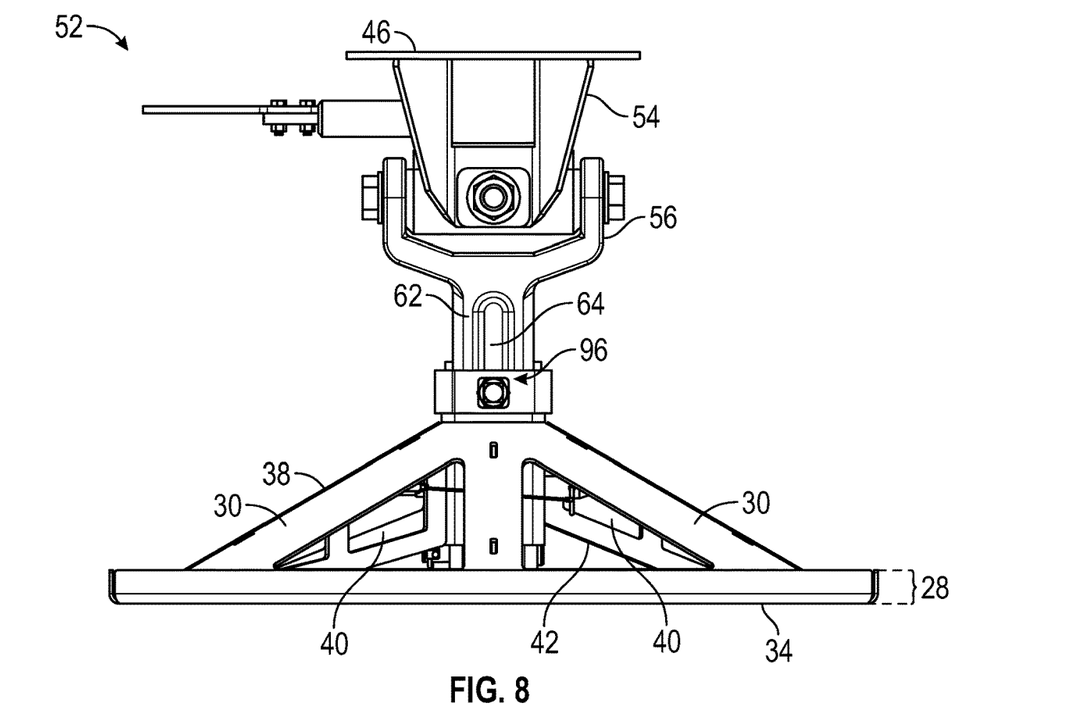
FIG. 8 is a front view of the fifth wheel hitch shown in FIGS. 3-7.
Figure 9:
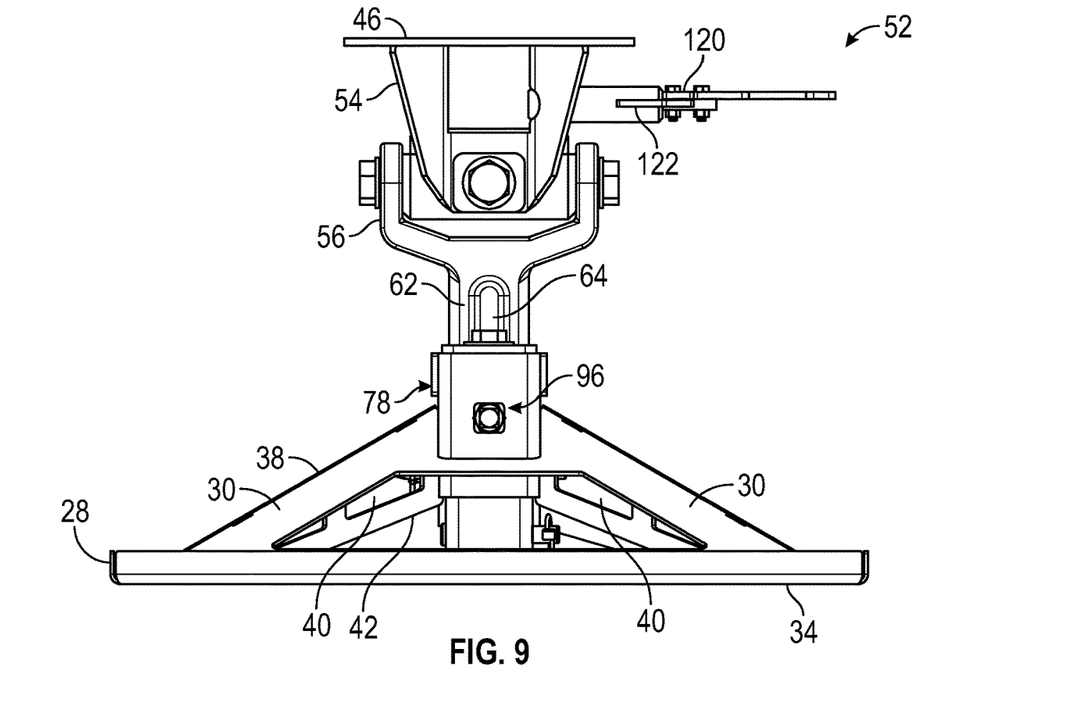
FIG. 9 is a rear view of the fifth wheel hitch shown in FIGS. 3-8.

FIGS. 8, 9 illustrate front and rear views, respectively, of the fifth wheel hitch 10 of FIGS. 3-7. In particular, FIG. 8 shows a second channel lock 96 located on the height adjustment sleeve 66 above the base assembly 26. The second channel lock 96 may also comprise a threaded bolt 74 extending through an internally threaded aperture 76 positioned on the front of the height adjustment sleeve 66. Tightening the threaded bolt 74 provides a biasing force against the vertical member 62 to selectively lock the vertical member 62 at a particular vertical position within the height adjustment sleeve 66. The threaded bolt 74 may be aligned inside channel 64 of the vertical member 62 to help maintain the threaded bolt 74 in a proper position against the vertical member 62. Here the second channel lock 96 is depicted as square head threaded bolt 74 and a threaded aperture 76 for receiving the threaded bolt 74. However, other types of fasteners are also contemplated by the present disclosure including hex head threaded bolts and as previously disclosed above with respect to FIGS. 4, 5.

Shown in FIGS. 8, 9, at least two channel locks 72, 96 are utilized by the present disclosure to lock the vertical member 62 in a vertical position with respect to the height adjustment sleeve 66. The at least two channel locks 72, 96 are also utilized to prevent rattling of the vertical member 62 inside the height adjustment sleeve 66 and to provide a more secure connection during operation. It is contemplated, however, that more or less than two channel locks 72, 96 may also be utilized by the present disclosure.

Further shown in FIGS. 8, 9, the at least one support brace 42 is structured to provide additional reinforcement to the base assembly 26 during towing of the fifth wheel trailer 12. It is also contemplated that a plurality of support braces 42 may be utilized to enhance the structural integrity of the fifth wheel hitch 10 of the present disclosure.

Figure 10:
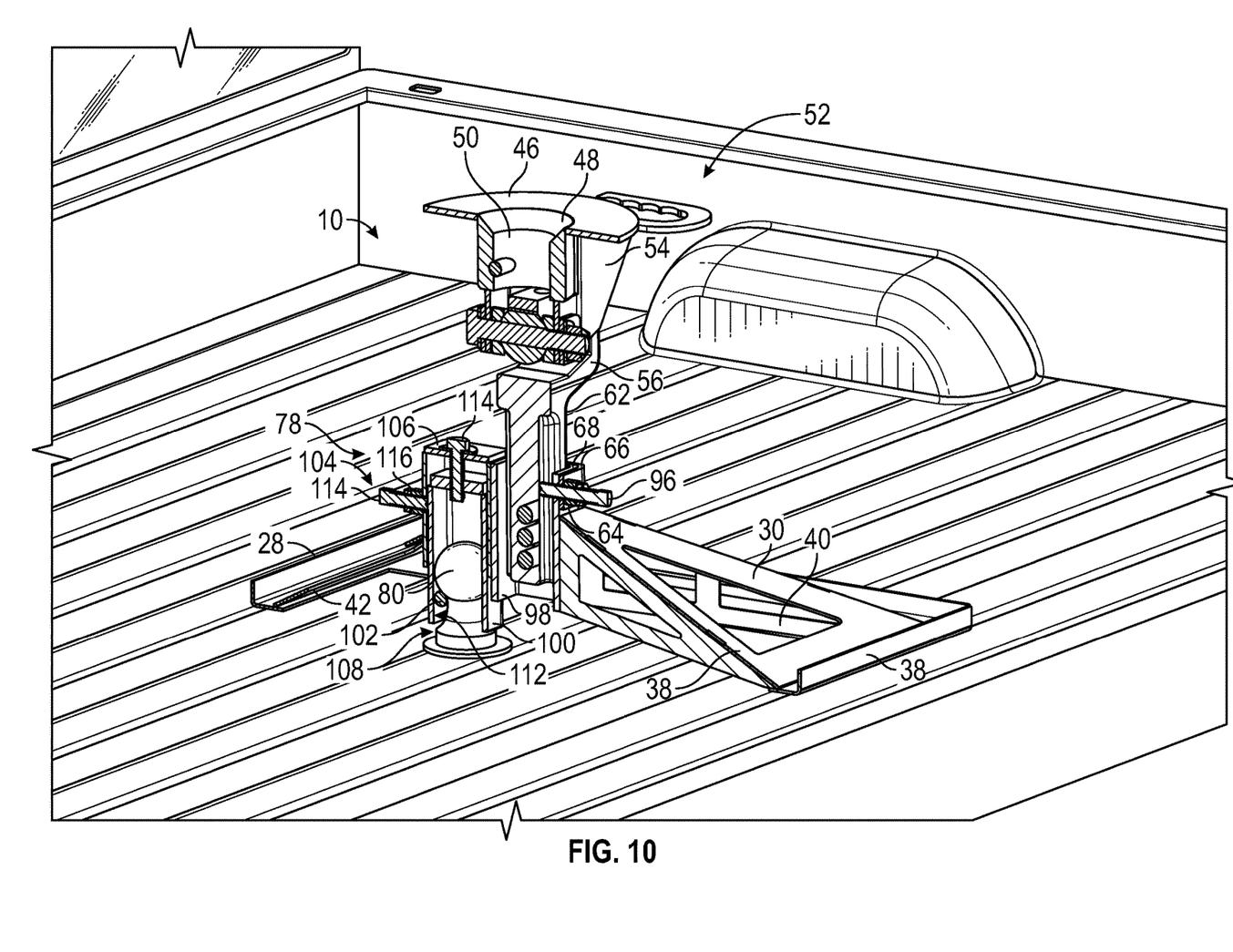
FIG. 10 is a magnified, sectional view of the rear of the fifth wheel hitch of FIG. 9, showing a connecting mechanism removably attached to a hitch ball in the bed of the towing vehicle.

FIG. 10 illustrates a magnified, sectional view of the rear of the fifth wheel hitch 10 of FIG. 9, showing a connecting mechanism 78 removably attached to a hitch ball 80 in the bed 16 of the towing vehicle 14. In particular, the connecting mechanism 78 may comprise a coupling sleeve 98, a hitch ball receiver 100, a hitch ball locking device 102, and a plurality of hitch ball restraining devices 104. The coupling sleeve 98 may be affixed to the height adjustment sleeve 66 of the base assembly 26 and comprise a closed upper end 106 and an opposite, open lower end 108 for receiving the hitch ball receiver 100. The hitch ball receiver 104 is configured to telescopingly slide inside the coupling sleeve 98 such that the hitch ball receiver 104 may be positioned over and lowered onto the hitch ball 80 mounted on the bed 16 of the towing vehicle 14. While the coupling sleeve 98 and the hitch ball receiver 104 are depicted in FIG. 10 as having a square cross section, it is contemplated by the present disclosure that these elements could also comprise a cylindrical, rectangular or other polygonal shape. The hitch ball locking device 102 may include a removable pin and a pair of aligned apertures, wherein the pair of aligned apertures are positioned offset from the center of the hitch ball receiver 104. The pin is adapted to extend through the pair of aligned apertures 112 to retain the hitch ball 80 inside the hitch ball receiver 100 in a locked position 112, wherein the pin may be held in the locked position 112 using a removable lynch pin, r-clip, cotter pin or other fastening device (not shown).

Shown in FIG. 10, after the hitch ball 80 is retained inside the hitch ball receiver 100 in the locked position 112, the plurality of hitch ball restraining devices 104 may also be torqued to retain the hitch ball receiver 100 inside the coupling sleeve 98. In particular, the plurality of hitch ball restraining devices 104 may comprise threaded bolts 114 extending through internally threaded apertures 116 positioned on the rear and top of the coupling sleeve 98. Tightening the threaded bolts 114 provides a biasing force against the hitch ball receiver 100 to selectively lock the hitch ball receiver 100 at a particular vertical position within the coupling sleeve 98. Here the plurality of hitch ball restraining devices 104 are depicted as square or hex head threaded bolts 114 and a threaded aperture 116 for receiving the threaded bolts 114. However, other types of fasteners are also contemplated by the present disclosure including those previously disclosed above with respect to FIGS. 4, 5. During use, the plurality of hitch ball restraining devices 104 are torqued to pull the platform 28 of the base assembly 26 tight against the bed 16 of the towing vehicle 14, wherein friction between the platform 28 and bed 16 helps firmly secure the fifth wheel hitch 10 in position. After use, the pin 110 may be retracted from the pair of aligned apertures 112 to correspond to an unlocked position (not shown) that allows for removal of the hitch ball 80 from the hitch ball receiver 104.

Another aspect of the present disclosure is a method of using the fifth wheel hitch 10 of FIGS. 1-10 to pull a fifth wheel trailer 12 using towing vehicle 14. In particular, the method may comprise providing fifth wheel hitch 10, fifth wheel trailer 12, and towing vehicle 14. The fifth wheel hitch 10 may be connected to the hitch ball 80 in the bed 16 of the towing vehicle 14 using connecting mechanism 78. Depending on the variances in different sizes of towing vehicles 14 and fifth wheel trailers 12, the hitch head assembly 44 may be raised or lowered to an appropriate height with respect to the base assembly 26 of the fifth wheel hitch 10 and vertically secured in position using the first and second channel locks 72, 96.

The method of the present disclosure further comprises positioning the towing vehicle 14 in front of the fifth wheel trailer 12, particularly, with the funnel shaped kingpin receiver opening 48 of the fifth wheel hitch 10 aligned approximately underneath kingpin 20. The latch handle 84 of the fifth wheel hitch 10 may be manually pulled and rotated as needed to abut the stopper 86 against conduit 90 and thereby remove the locking pin 88 from the socket 50.

In this manner the latching and locking mechanism 52 in transitioned into the open and unlocked position 82 for receiving kingpin 20. The kingpin 20 of the towing vehicle 14 may then be vertically lowered into the kingpin receiver opening 48 of the fifth wheel hitch 10, wherein the funnel shaped kingpin receiver opening 48 is cantilevered to help guide the kingpin 20 into the kingpin receiver socket 50 as it is lowered vertically into position.

The method of the present disclosure may further comprise confirming whether a secure connection between the kingpin 20 and fifth wheel hitch 10 has been properly executed by attempting to transition the latching and locking mechanism 52 to the closed and locked position 94. In particular the latch handle 84 may be manually pulled and rotated as needed to disengage the stopper 86 from abutting against conduit 90. In this manner the stopper 86 is drawn back into conduit 90 and the locking pin 88 is drawn back into socket 50 by biasing spring 92. The latching and locking mechanism 52 is in the closed and locked position 94 when the locking pin 88 is inserted within the annular groove 22 of the adjacent kingpin 20 to effectively lock the kingpin 20 inside the socket 50 of the hitch head assembly 44. If the latching and locking mechanism 52 will not transition into the closed and locked position 94, the connection between the towing vehicle 14 and the fifth wheel trailer 12 may be adjusted until the locking pin 88 is insertable within the annular groove 22 of the adjacent kingpin 20. After the latching and locking mechanism 52 is able to transition into the closed and locked position 94 the operator has both physical and mental assurance that the connection between the fifth wheel trailer 12 and the towing vehicle 14 is securely and reliably locked by the fifth wheel hitch 10, ready for travel.

The fifth wheel hitch 10 and method of use of the present disclosure are universally applicable to towing vehicles 14 and fifth wheel trailers 14 of all, makes, models, sizes and manufacturers. Although the disclosure has been described and illustrated with respect to preferred aspects thereof, it is not to be so limited since changes, modifications, and combinations thereof may be made which are within the full intended scope of the disclosure.

What is claimed is:

1. A fifth wheel hitch, comprising:
a base assembly, comprising:
a) a platform configured to contact and rest upon a surface of a bed of a towing vehicle;
b) a plurality of side walls affixed to the platform and forming a pyramidal shape having a central top opening;
c) at least one support brace structured to provide reinforcement to the plurality of side walls;
d) a height adjustment sleeve traversing through the central top opening and affixed to the plurality of side walls and the at least one support brace;
a hitch head assembly, comprising:
a) a horizontally-oriented hitch plate configured to abuttingly engage a trailer plate of a fifth wheel trailer;
b) a funnel shaped kingpin receiver opening connected to an inner edge of the hitch plate;
c) a kingpin receiver socket connected to an inner edge of the kingpin receiver opening;
d) the funnel shaped kingpin receiver opening cantilevered to guide a kingpin of the fifth wheel trailer into the kingpin receiver socket as a kingpin of the fifth wheel trailer is lowered vertically;
e) the kingpin receiver socket configured for receiving the kingpin of the fifth wheel trailer in a vertical motion;
f) a latching and locking mechanism configured to secure the kingpin inside the kingpin receiver socket;
g) a four-way pivot joint attached to the kingpin receiver socket;
h) the four-way pivot joint configured to pivot about a horizontally-oriented fore and aft axis and a horizontally-oriented, transverse axis;
i) the four-way pivot joint configured to enable the hitch head assembly to automatically adapt to an abutting engagement with the trailer plate of the fifth wheel trailer; and
j) a vertical member attached to the four-way pivot joint;
the vertical member of the hitch head assembly removably connected to the height adjustment sleeve of the base assembly;
the vertical member configured to telescopingly slide inside the height adjustment sleeve wherein the hitch head assembly is adjustable in height to fit different sizes of towing vehicles and fifth wheel trailers; and
a connecting mechanism affixed to the height adjustment sleeve of the base assembly, the connecting mechanism structured to attach the fifth wheel hitch to a hitch ball of the towing vehicle.

2. The fifth wheel hitch of claim 1, wherein the hitch head assembly is configured to secure the kingpin of the fifth wheel trailer without an adapter or extension.

3. The fifth wheel hitch of claim 1, the hitch head assembly further comprising:
a plurality of brackets attached to the hitch plate, funnel shaped kingpin receiver opening and kingpin receiver socket;
wherein the plurality of brackets are structured to provide additional support to the hitch head assembly.

4. The fifth wheel hitch of claim 1, further comprising:
the vertical member having a series of channels, wherein at least one side of the vertical member includes a channel extending vertically along an exterior of the vertical member; and
the height adjustment sleeve having at least two channel locks;
wherein the at least two channel locks and the series of channels are configured to selectively lock the vertical member in a vertical position within the height adjustment sleeve.

5. The fifth wheel hitch of claim 1, the latching and locking mechanism comprising:
a latch handle;
a locking pin connected to the latch handle;
a conduit;
the locking pin extending into the kingpin receiver socket through the conduit;
a biasing spring configured to secure the locking pin inside the conduit;
an open and unlocked position for receiving or removing the kingpin from the kingpin receiver socket;
a closed and locked position for securing the kingpin in the kingpin receiver socket;
the latch handle rotatable to transition the latching and locking mechanism between the open and unlocked position and the closed and locked position; and
the locking pin within an annular groove of the kingpin in the closed and locked position of the latching and locking mechanism.

6. The fifth wheel hitch of claim 5, wherein the closed and locked position of the latching and locking mechanism is configured to provide confirmation that a secure connection has been made between the kingpin of the fifth wheel trailer and the fifth wheel hitch.

7. The fifth wheel hitch of claim 1, the connecting mechanism comprising:
   a coupling sleeve affixed to the height adjustment sleeve of the base assembly;
   a hitch ball receiver configured to telescopingly slide inside the coupling sleeve;
   the hitch ball receiver configured to be lowered from the coupling sleeve and positioned over the hitch ball of the towing vehicle;
   a hitch ball locking device configured to retain the hitch ball inside the hitch ball receiver in a locked position; and
   a plurality of hitch ball restraining devices configured to retain the hitch ball receiver inside the coupling sleeve;
   wherein the plurality of hitch ball restraining devices are configured to pull the platform of the base assembly tight against the bed of the towing vehicle to firmly secure the fifth wheel hitch in position.

8. The fifth wheel hitch of claim 7, wherein the hitch ball locking device comprises a removable pin and a pair of aligned apertures positioned offset from the center of the hitch ball receiver.

9. The fifth wheel hitch of claim 8, wherein the plurality of hitch ball restraining devices comprise threaded bolts extending through internally threaded apertures positioned on the rear and top of the coupling sleeve.

10. The fifth wheel hitch of claim 1, wherein the kingpin receiver socket is structured to prevent the kingpin from sliding horizontally out of the hitch head assembly after being pulled forward by the towing vehicle because the kingpin can only be removed from the kingpin receiver socket vertically.

11. A fifth wheel hitch, comprising:
    a base assembly configured to removably connect to a hitch ball of a towing vehicle;
    the base assembly connected to a hitch head assembly;
    the hitch head assembly adjustable in height with respect to the base assembly;
    the hitch head assembly comprising a four-way pivot joint;
    the hitch head assembly configured to secure a kingpin of a fifth wheel trailer;
    the kingpin of the fifth wheel trailer secured to the hitch head assembly in a vertical motion rather than horizontal;
    the kingpin secured inside the hitch head assembly via a latching and locking mechanism; and
    the latching and locking mechanism structured to indicate whether a secure connection has been made between the kingpin of the fifth wheel trailer and the fifth wheel hitch.

12. The fifth wheel hitch of claim 11, wherein the hitch head assembly is configured to secure the kingpin of the fifth wheel trailer without an adapter or extension.

13. The fifth wheel hitch of claim 12, the hitch head assembly comprising:
    a horizontally-oriented hitch plate for engaging a trailer plate of the fifth wheel trailer;
    a kingpin receiver opening positioned in the center of the hitch plate;
    a kingpin receiver socket positioned in the center of the kingpin receiver opening;
    the kingpin receiver opening comprising a funnel shape to guide the kingpin into the kingpin receiver socket as the kingpin is lowered vertically into the kingpin receiver socket; and
    the kingpin receiver socket structured to prevent the kingpin from sliding horizontally out of the hitch head assembly after being pulled forward by the towing vehicle.

14. The fifth wheel hitch of claim 13, further comprising:
    the four-way pivot joint configured to pivot about a horizontally-oriented fore and aft axis;
    the four-way pivot joint configured to pivot about a horizontally-oriented, transverse axis;
    the four-way pivot joint configured to enable the hitch plate to automatically adapt to an abutting engagement with the trailer plate of the fifth wheel trailer;
    the four-way pivot joint configured to accommodate instantaneous variations in pitch or roll between the towing vehicle and the fifth wheel trailer; and
    the four way pivot joint configured to reduce shock to the towing vehicle and the fifth wheel trailer during use.

15. The fifth wheel hitch of claim 14, the latching and locking mechanism comprising:
    a latch handle;
    a locking pin connected to the latch handle;
    a conduit;
    the locking pin extending into the kingpin receiver socket through the conduit;
    a biasing spring configured to secure the locking pin inside the conduit;
    an open and unlocked position for receiving or removing the kingpin from the kingpin receiver socket;
    a closed and locked position for securing the kingpin in the kingpin receiver socket;
    the latch handle rotatable to transition the latching and locking mechanism between the open and unlocked position and the closed and locked position; and
    the locking pin within an annular groove of the kingpin in the closed and locked position of the latching and locking mechanism.

16. A method of using a fifth wheel hitch, comprising:
    providing a fifth wheel hitch, comprising:
    a) a base assembly configured to removably connect to a hitch ball of a towing vehicle;
    b) the base assembly connected to a hitch head assembly;
    c) the hitch head assembly adjustable in height with respect to the base assembly;
    d) the hitch head assembly comprising a four-way pivot joint;
    e) the hitch head assembly configured to secure a kingpin of a fifth wheel trailer;
    f) the kingpin secured inside the hitch head assembly via a latching and locking mechanism; and
    g) the latching and locking mechanism structured to indicate whether a secure connection has been made between the kingpin of the fifth wheel trailer and the fifth wheel hitch;
    providing the fifth wheel trailer;
    providing the towing vehicle;
    connecting the fifth wheel hitch to the hitch ball of the towing vehicle;
    raising or lowering the hitch head assembly of the fifth wheel hitch to an appropriate height depending on a particular size of the towing vehicle and fifth wheel trailer;

positioning the hitch head assembly of the fifth wheel hitch beneath the kingpin of the fifth wheel trailer;

transitioning the latching and locking mechanism of the fifth wheel hitch to an open and unlocked position for receiving the kingpin;

vertically lowering the kingpin into the hitch head assembly;

transitioning the latching and locking mechanism to the closed and locked position to lock the kingpin inside the hitch head assembly; and confirming whether a secure connection between the kingpin and the fifth wheel hitch has been properly executed.

17. The method of claim 16, further comprising securing the kingpin of the fifth wheel trailer in the hitch head assembly of the fifth wheel hitch without using an adapter or extension.

18. The method of claim 17, further comprising:

vertically lowering the kingpin into a funnel shaped kingpin receiver opening of the hitch head assembly to guide the kingpin into a kingpin receiver socket; and preventing the kingpin from sliding horizontally out of the hitch head assembly after being pulled forward by the towing vehicle because the kingpin can only be removed from the kingpin receiver socket vertically.

19. The method of claim 18, further comprising:

pivoting the hitch head assembly about a horizontally-oriented fore and aft axis via the four-way pivot joint;

pivoting the hitch head assembly about a horizontally-oriented, transverse axis via the four-way pivot joint;

automatically adapting a hitch plate of the hitch head assembly to an abutting engagement with a trailer plate of the fifth wheel trailer via the four-way pivot joint;

accommodating instantaneous variations in pitch or roll between the towing vehicle and the fifth wheel trailer via the four-way pivot joint; and reducing shock to the towing vehicle and the fifth wheel trailer via the four-way pivot joint.

20. The method of claim 19, wherein confirming whether a secure connection between the kingpin and the fifth wheel hitch has been properly executed comprises:

attempting to transition the latching and locking mechanism to a closed and locked position after the kingpin has been vertically lowered through the funnel shaped kingpin receiver opening of the hitch head assembly into the kingpin receiver socket;

determining whether a locking pin of the latching and locking mechanism is inserted within an annular groove of the adjacent kingpin to effectively lock the kingpin inside the kingpin receiver socket of the hitch head assembly; and recognizing that if the locking pin is inserted and the latching and locking mechanism is transitionable to the closed and locked position that the connection between the fifth wheel trailer and the towing vehicle is securely locked by the fifth wheel hitch.

\* \* \* \* \*